(12) United States Patent
Sicko et al.

(10) Patent No.: US 10,696,497 B2
(45) Date of Patent: Jun. 30, 2020

(54) SYSTEM AND METHOD FOR BUFFERING DIFFERENTLY CUT BOARDS FOR A WOODEN STRUCTURE

(71) Applicants: Carlo Sicko, Zaisenhausen (DE); Jochen Sicko, Zaisenhausen (DE)

(72) Inventors: Carlo Sicko, Zaisenhausen (DE); Jochen Sicko, Zaisenhausen (DE)

(73) Assignee: Sicko GmbH, Zaisenhausen (DE)

(*) Notice: Subject to any disclaimer, the term of this patent is extended or adjusted under 35 U.S.C. 154(b) by 43 days.

(21) Appl. No.: 16/185,713

(22) Filed: Nov. 9, 2018

(65) Prior Publication Data
US 2019/0144215 A1 May 16, 2019

(30) Foreign Application Priority Data
Nov. 10, 2017 (DE) .................. 10 2017 126 362

(51) Int. Cl.
*B65G 57/04* (2006.01)
*B65G 47/44* (2006.01)
*B65G 57/18* (2006.01)

(52) U.S. Cl.
CPC ............. *B65G 57/04* (2013.01); *B65G 47/44* (2013.01); *B65G 57/18* (2013.01); *B65G 2201/0282* (2013.01)

(58) Field of Classification Search
CPC ........ B65G 47/44; B65G 57/04; B65G 57/18; B65G 61/00; B65G 2201/0282; B65H 31/3009
USPC ........... 198/347.4; 414/268, 269, 328, 745.7, 414/746.8, 752.1, 789.9, 790, 790.5, 793
See application file for complete search history.

(56) References Cited

U.S. PATENT DOCUMENTS

| | | | | |
|---|---|---|---|---|
| 3,653,506 A * | 4/1972 | Turner | ............. | B65G 47/44 209/518 |
| 3,913,744 A * | 10/1975 | Turner | ............. | B65G 47/44 198/367 |
| 3,920,134 A * | 11/1975 | Scarpa | ............. | B65G 47/44 414/790.5 |
| 4,081,088 A * | 3/1978 | Rysti | ............. | B65G 47/44 198/447 |
| 4,205,751 A * | 6/1980 | Rysti | ............. | B65G 47/44 209/517 |

(Continued)

FOREIGN PATENT DOCUMENTS

| | | | |
|---|---|---|---|
| DE | 19508438 C1 * | 11/1995 | ............. B65D 90/64 |
| WO | WO 2014155445 A1 | 10/2014 | |

*Primary Examiner* — James Keenan
(74) *Attorney, Agent, or Firm* — Bose McKinney & Evans LLP

(57) ABSTRACT

A system and a method are described for the intermediate storage of differently cut boards for a wooden structure, in particular a truss, with several compartments arranged laterally adjacent to one another. The compartments are each configured for receiving a set of boards for such a wooden structure, wherein a set is to be understood as the entirety of cut boards which are required for such a wooden structure. A feeding device fills the cut boards into the individual compartments and stacks them over one another therein. The compartments can be opened respectively at their underside, in order to remove the set of boards. A discharge device transports away the set of boards removed from the respective compartment.

16 Claims, 2 Drawing Sheets

(56) References Cited

U.S. PATENT DOCUMENTS

| | | | | |
|---|---|---|---|---|
| 4,281,953 A * | 8/1981 | Newnes | ............... | B65G 47/44 |
| | | | | 414/268 |
| 4,725,181 A * | 2/1988 | Mine | ............... | A24B 3/00 |
| | | | | 198/451 |
| 4,815,917 A * | 3/1989 | Newnes | ............... | B65G 47/44 |
| | | | | 209/521 |
| 4,978,275 A * | 12/1990 | Reid | ............... | B65G 57/005 |
| | | | | 198/419.1 |
| 5,348,440 A * | 9/1994 | Focke | ............... | B65G 61/00 |
| | | | | 414/792.9 |
| 5,456,573 A * | 10/1995 | Morris | ............... | B65H 1/06 |
| | | | | 271/217 |
| 5,647,720 A * | 7/1997 | Golicz | ............... | B62B 1/14 |
| | | | | 414/490 |
| 6,095,314 A | 8/2000 | Fortenbery | | |
| 6,675,952 B1 * | 1/2004 | Hannebauer | ............... | B65G 47/44 |
| | | | | 198/367 |
| 8,297,615 B2 * | 10/2012 | Nakamura | ............... | B62B 1/14 |
| | | | | 414/490 |

\* cited by examiner

SYSTEM AND METHOD FOR BUFFERING DIFFERENTLY CUT BOARDS FOR A WOODEN STRUCTURE

RELATED APPLICATIONS

This application claims priority to DE 10 2017 126 362.4, filed Nov. 10, 2017, the disclosure of which is hereby incorporated by reference in its entirety.

BACKGROUND

This disclosure relates to a system and a method for buffering (i.e., intermediate storage) of differently cut boards for a wooden structure, in particular a roof truss.

The wooden structure can be a supporting structure of a roof, for example a roof truss ("truss"). Such wooden structures are assembled from differently cut boards. The boards are elongate, in particular straight, and have respectively a longitudinal direction. The truss can be, in particular, a trussed rafter, in particular in the form of a nailed truss or nail plate truss, in which the boards form a supporting structure of compression members and tension members. The totality of the boards designated for such a wooden structure is called a set or board set in the present application. In the case of a truss or similar wooden structures, such a set typically contains approximately one or two dozen cut boards of different length. The length can lie in the range of 20 cm to 6 m. The cross-section of the boards can be, in particular, rectangular. The boards of a set can have different widths and/or thicknesses here.

Trusses and other wooden structures can be prefabricated in production lines. Here, firstly the various boards of a set are cut from large, in particular long, boards. In modern production lines software is used that specifies for a given number of sets, for example eight or twelve sets, the sequence in which the required set elements are to be cut from the large boards which are available. In this way the large boards can be utilized very economically such that as little loss of material as possible occurs. As a consequence, all boards, which are required for the sets, are produced in a production line in a sequence that may change as a function of the available boards to be cut and the numbers and sizes of boards needed for the sets. Often, more boards of a particular cut are repeatedly produced than are required for an individual set. These must therefore be stored intermediately (i.e., buffered), until the respective sets are complete. As soon as a complete set of cut boards is available, the wooden structure, for instance a truss, can then be assembled from this set in a further station of the production line.

Currently in such production lines, a vertically movable rack is used for the intermediate storage of differently cut boards, in the compartments of which rack respectively cut boards for a set are collected lying adjacent to one another. A control unit monitors which set elements, i.e., cut boards, are already present in which rack compartment, and makes provision that only the cut boards which are still missing for the respective set are filled into each rack compartment. As soon as a complete set of boards is contained in such a rack compartment, the set can be removed and delivered to the next production station.

Such vertically adjustable racks are complex, in particular because they are lowered beneath the level of the floor in order to receive the cut boards which are delivered from a conveyor belt.

SUMMARY

This disclosure teaches how buffering of differently cut boards for a wooden structure is possible with less effort.

A system according to this disclosure for buffering differently cut boards for a wooden structure has several compartments arranged in a lateral row. This row is transverse to the longitudinal direction of the boards. In each of these compartments, cut boards are collected and stacked one above the other until a complete set of boards is present in the respective compartment. Then the compartments are opened at their underside and the set contained in the respective compartment, in particular in stacked form as a board stack, is removed. As further components, a system according to this disclosure contains a feeding device, in order to fill the cut boards into the individual compartments and to stack them therein one above the other, and a discharge device, in order to transport the boards from the individual compartments, in particular in sets.

By stacking the boards in the compartments, a mark, arranged during cutting of the boards on their surface, for example a number to identify the later position of the board in the truss, can remain easily visible on the upper side of the board during stacking and removing of the set. This can facilitate the allocation of the boards during the assembly of the truss from the board set.

The system according to this disclosure is suitable in particular for use in a production line for trusses. The system can have, as a further component, a control unit which respectively detects the differently cut boards which are delivered in a rather unpredictable sequence, and distributes them to the individual compartments, therefore controls both the feeding device and also the discharge device and the opening of the compartments for the removal of the board sets. This control can be provided as a separate control unit of the system or can be undertaken by the entire control of a production line into which the system is integrated.

For each of the individual compartments, the control unit stores which elements of a set are already deposited therein and which are still missing, therefore which cut boards are already present in the respective compartment and which are still missing for a complete set.

Compartments of a system according to this disclosure which are arranged adjacent to one another can enable a compact and easy buffering of the cut boards. As the compartments are arranged adjacent to one another, and the boards are stacked over one another in them, such buffer can be integrated into an existing production line with minimal effort. In particular, eight to twelve compartments can be provided. Hereby, a high degree of optimization can already be achieved with low waste. However, more compartments, for example twenty, can also be provided. This increases the capacity of the intermediate store, which enables a storage of complete sets over a certain time. This can be advantageous especially when for example four board sets are cut at the same time and the corresponding compartments are full practically at the same time, but the installation of the four trusses from these board sets can not take place at the same time or takes up a longer period of time. The cutting station of the production line can nevertheless continue to work without interruption, because in addition to the full compartments, a sufficient number of empty ones are available.

Typically for a wooden structure such as a truss, approximately one or two dozen cut wooden boards are required. With a typical thickness of the wooden boards of approximately two to five centimetres, it follows therefrom that for most applications an individual compartment must receive only a wood stack of approximately one metre in height. The individual board stacks can be removed from the compartments with little effort, by the compartments being opened at their underside, for example by the compartments having respectively a base formed as a flap, and therefore can be opened by pivoting the base flap.

The board set contained in a compartment can then be removed from the compartment by gravity, and can be transported away by means of a discharge device. The discharge device can be a conveyor belt, for example. In particular, however, a transport trolley can also be used as discharge device. As the maximum stack height for most applications is not more than one metre, the board stacks which are removed from the compartments can be transported under the compartments without difficulty, without structural alterations such as an underfloor construction being necessary in a production hall. The filling of the compartments from above and the emptying downwards prevents the feeding device and the discharge device from impeding one another reciprocally. This can enable an interruption-free working, in particular an interruption-free feeding.

A further refinement of this disclosure makes provision that the transport trolley has a vertically adjustable carrying surface for receiving the set of boards, in particular in the form of a board stack. With a vertically adjustable carrying surface, problems can be avoided during the removal of the stacked boards from the individual compartments. When the boards are removed from a compartment, the carrying surface of a transport trolley is then firstly adjusted to a greater height, in order to prevent the board stack from dropping a large distance. The carrying surface is then lowered slowly and in so doing the board stack is removed entirely from the respective compartment. In particular, the carrying surface can run transversely to a supporting surface which, during the removing of the set of boards from one of the compartments, is inclined from the vertical by an acute angle, for example by an angle of 10° to 40°. In this way, a board stack can be held on the vertically adjustable carrying surface and leans during transportation against the inclined supporting surface. The supporting surface can be mounted pivotably or rotatably on the transport trolley, in order to support the board stack even more securely during transport by an increase in its inclination.

In an embodiment of this disclosure, provision can be made that the boards are each deposited centrally to one another with regard to their longitudinal direction and/or their transverse direction. The boards can also be deposited centrally in the individual compartments with regard to the longitudinal direction of the compartments. The central stacking gives the board stack an inherent stability and can prevent the boards from falling in a disordered manner. In this way, a board stack can be handled better during transportation and can be reliably supported in its center.

In an embodiment of this disclosure, provision can be made that the feeding device contains a gripper for at least one board, in particular a vacuum gripper. The gripper can receive boards from a conveyor belt and deposit them into the compartments. For this, the gripper can be movable horizontally and vertically. The gripper can be configured such that it can simultaneously grip several, for example four, boards lying over one another. In particular, the gripper can be configured such that the gripper can deposit a portion of these simultaneously gripped boards in one of the compartments and another portion of these boards in other compartments. This configuration can accelerate the destacking of the boards in the compartments when several boards, lying over one another, are cut simultaneously in the production line and are delivered to the feeding device of the system.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
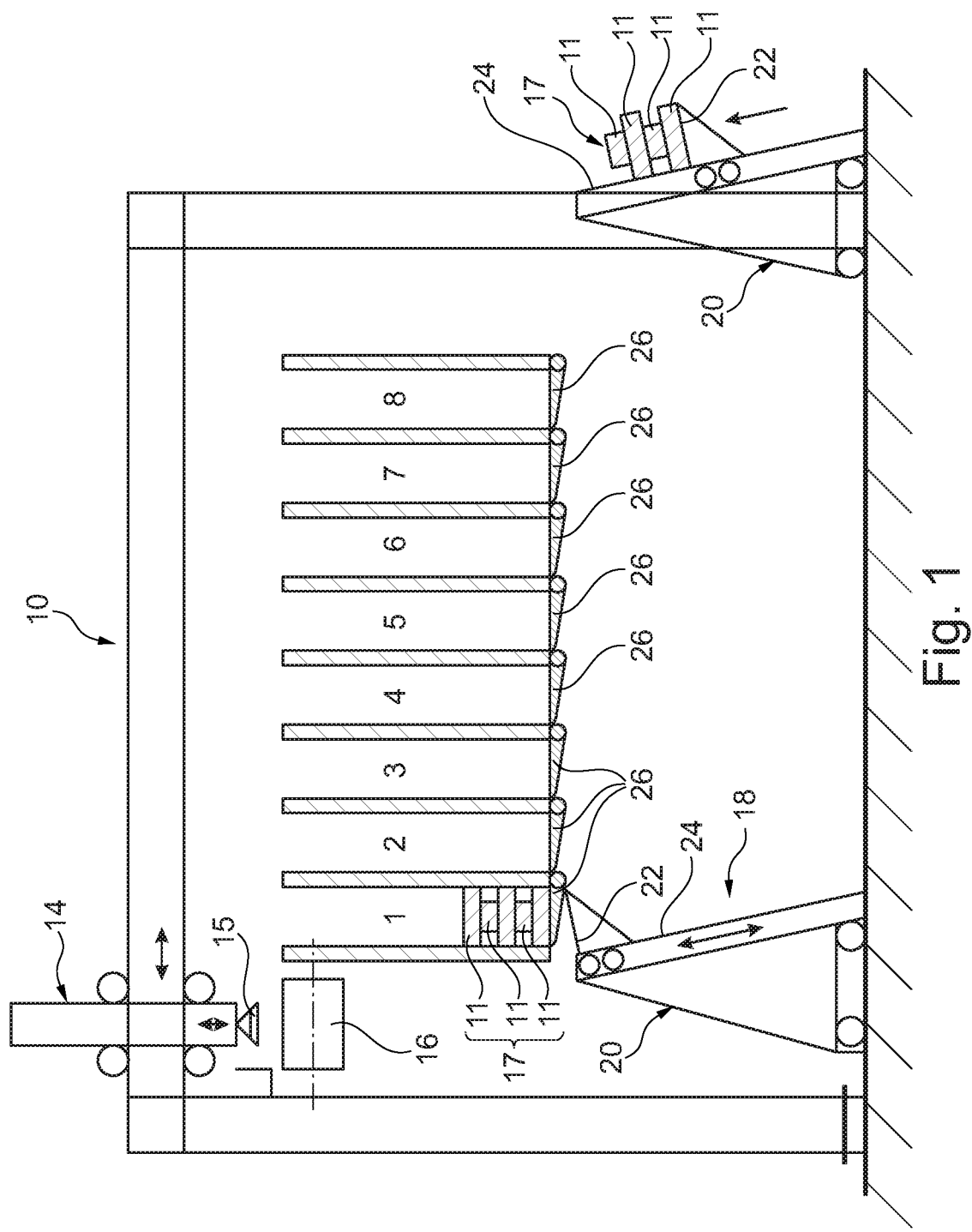
FIG. 1 is a diagrammatic illustration of an illustrative embodiment of a system for buffering of differently cut boards for a wooden structure.

In FIG. 1 a system 10 is illustrated for buffering (i.e., intermediate storage) of differently cut boards 11 for a wooden structure, for example a truss. The system 10 has several compartments 1 to 8, arranged adjacent to one another, in which the differently cut boards 11 are stored. Compartments arranged laterally adjacent to one another are sometimes also designated as comb compartments.

In the embodiment illustrated in FIG. 1, eight different compartments 1, 2, 3, 4, 5, 6, 7, 8 are provided. In these compartments 1 to 8, differently cut boards 11 are stacked centrally one above the other by a feeding device 14, for example a gripper 15, in particular a vacuum gripper. The gripper 15 is movable between a conveyor belt 16, on which the boards 11 are delivered from the production line, and the compartments 1 to 8. The gripper travels horizontally to a position above the desired compartment and lowers itself into the compartment, in order to deposit the board 11 centrally therein. A control unit monitors that precisely the cut boards 11 are filled into each of the compartments 1 to 8 which are required for a set. For example, a set of boards 11 can contain one very long board 11, two identically configured boards 11 of medium length and eight short boards 11 with obliquely cut ends. In such a case, the control unit would monitor that precisely one very long cut board 11, two cut boards 11 of medium length and eight short boards 11 are filled into each of the compartments 1 to 8, so that each of the compartments 1 to 8 eventually receives one complete set.

When the gripper 15 has received simultaneously from the conveyor belt 16 several boards 11 lying over one another, it deposits therefrom the respectively required number in the compartments 1 to 8. When, for example, the gripper 15 has received three boards 11 lying over one another and when for example one of these boards 11 is required for the board set which is to be formed in compartment 7, and two of these boards 11 are required in compartment 8, the following sequence can be provided: The gripper 15 travels to compartment 7 and releases all three boards 11 lying over one another. Then the gripper grabs two of the three boards 11 again. Then the gripper 15 travels with these two boards 11 to compartment 8 and deposits them there. The destacking of the boards 11 is accelerated, because the gripper 15, instead of moving from compartment 7 to the conveyor belt 16 and then to compartment 8, only has to travel the short distance between compartment 7 and 8.

As soon as a complete set is contained in any one of the compartments, for example in compartment 1, the respective compartment 1 is opened at its underside and the board stack 17 contained therein is transported away by a discharge device 18. In the illustrated embodiment, the discharge device 18 comprises a transport trolley 20, which has a vertically adjustable carrying surface 22 for receiving the board stack 17. The vertically adjustable carrying surface 22 runs transversely to a supporting surface 24 which, on removing of the board stack 17 from the compartment 1, is included from the vertical by an acute angle, in particular by an angle of 10° to 40°. The carrying surface can be inclined by the same angle from the horizontal. Owing to the inclination of the supporting surface 24, the board stack 17 can lean against it and does not fall over.

The base 26 of the compartments 1 to 8 can be configured as a flap. By pivoting the base flap 26, the individual compartments 1 to 8 can be opened, so that the board stack 17 contained in compartments 1 to 8 then slides downwards under the effect of gravity onto the discharge device 18, for example onto the carrying surface 22 of the transport trolley 20. When the base flap 26 is opened, the carrying surface 22 is situated at a great height, as illustrated in FIG. 1. The carrying surface 22 is then lowered, in order to remove the board stack 17 from the compartment 1. Subsequently, the transport trolley 20 with the board set can be moved to an assembly station, at which the wooden structure is assembled from the boards 11 of this set.

Figure 2:
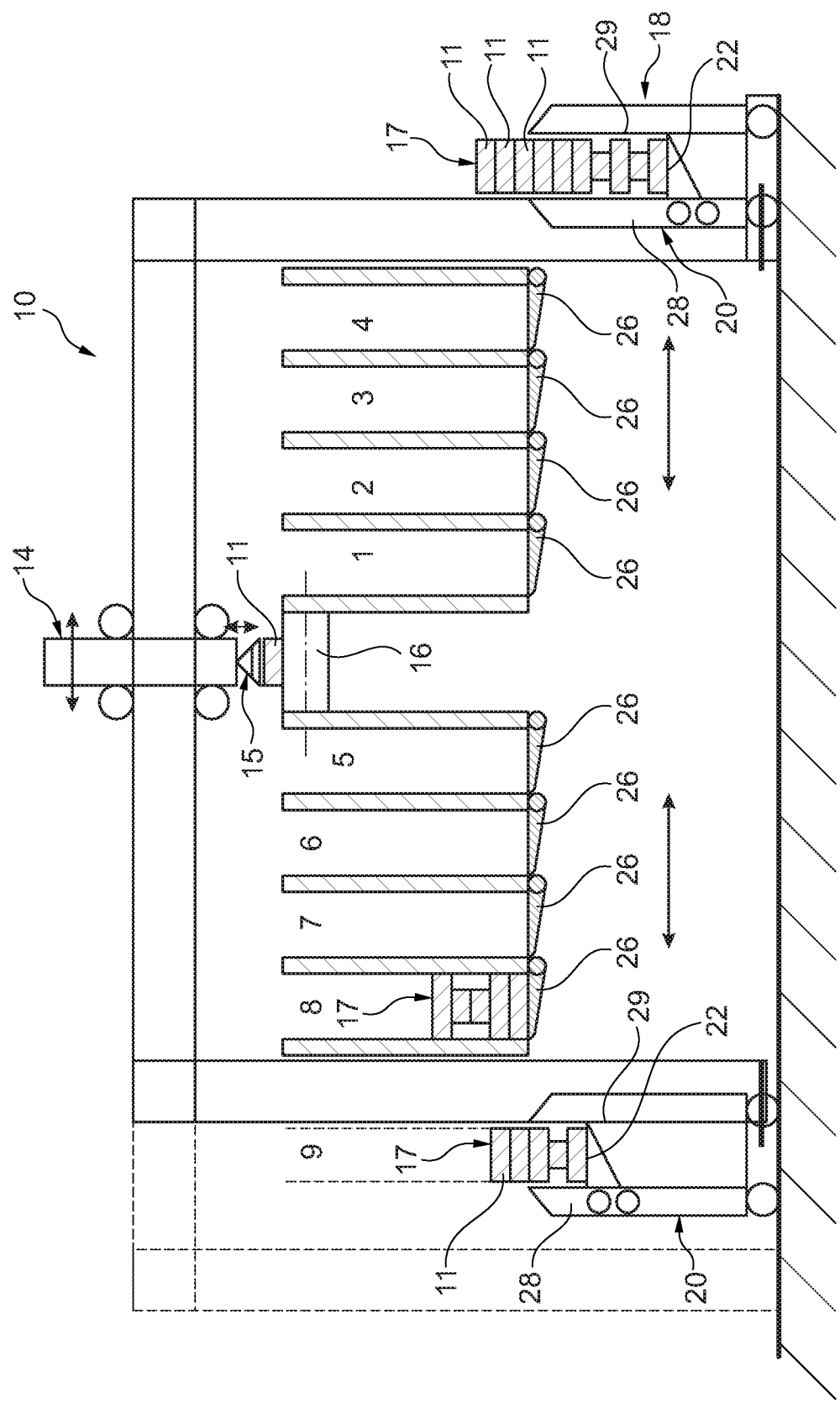
FIG. 2 is a diagrammatic illustration of another illustrative embodiment of a system for buffering differently cut boards for a wooden structure.

FIG. 2 shows a further embodiment of a system 10 for buffering differently cut boards 11 for a wooden structure. Whereas in the embodiment of FIG. 1 all compartments 1 to 8 are arranged in a single group adjacent to one another, in the embodiment of FIG. 2 the compartments 1 to 8 are arranged in two groups 1 to 4 on the right and 5 to 8 on the left adjacent to a position of rest of the feeding device 14 above the conveyor belt 16. In this way, the paths which are covered by the gripper 15 of the feeding device 14 during distributing of the cut boards 11 to the individual compartments 1 to 8 can be reduced. In the individual compartments 1 to 8, just as in the embodiment of FIG. 1, the cut boards 11 are then stored intermediately, until a complete set is contained in a compartment 1 to 8. As soon as a complete set of boards is present in a compartment 1 to 8, the respective compartment is opened at its underside and the board stack 17 contained in the compartment is transported away by a discharge device 18. In FIG. 2 on the left adjacent to compartment 8 a possible extension of the system 10 with a further compartment 9 is indicated by dashed lines. The compartment 9 can serve for example for the collecting of rejects.

In the embodiment of FIG. 2, just as in the embodiment of FIG. 1, the discharge device 18 is a transport trolley 20 with a vertically adjustable carrying surface 22. However, in the embodiment of FIG. 2, the transport trolley 20 has two vertically running supporting walls 28, 29, between which the board stack 17 is received. The two supporting walls 28, 29 prevent the stack from tipping over.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMERALS 1 compartment
2 compartment
3 compartment
4 compartment
5 compartment
6 compartment
7 compartment
8 compartment
9 compartment
10 system
11 boards
14 feeding device
15 gripper
16 conveyor belt
17 board stack
18 discharge device
20 transport trolley
22 carrying surface
24 supporting surface
26 base flap
28 supporting wall
29 supporting wall

The invention claimed is:

1. A system for buffering differently cut boards for a wooden structure, said system comprising:
    several individual compartments arranged in a lateral row, each compartment configured for receiving a set of boards for said wooden structure, wherein said set of boards includes all cut boards required for said wooden structure, said set of boards defining a plurality of different board lengths;
    a feeding device for filling the boards into the individual compartments and stacking them therein one above the other wherein the feeding device includes a vacuum gripper and deposits the boards in a stable stack within the individual compartments;
    wherein each compartment is configured to be opened at its bottom for removing a respective set of boards contained therein; and
    a discharge device for transporting said set of boards after removal from the respective compartment.

2. The system according to claim 1, wherein the compartments each comprise a base flap, and are openable by pivoting of the base flap.

3. The system according to claim 1, wherein the discharge device comprises at least one transport trolley for transporting a removed set of boards.

4. The system according to claim 3, wherein the transport trolley has a vertically adjustable carrying surface for receiving the set of stacked boards.

5. The system according to claim 4, wherein the carrying surface runs transversely to a supporting surface, which on removing of the set of boards from the respective compartment is inclined from the vertical by an acute angle.

6. The system according to claim 5, wherein the acute angle is between 10° and 40°.

7. The system according to claim 1, wherein the feeding device enters the individual compartments when depositing the boards.

8. The system according to claim 7, wherein the gripper deposits the boards in each compartment centrally with respect to the longitudinal direction of the compartment.

9. A method for buffering differently cut boards for building several wooden structures, the method comprising:
arranging several individual compartments in a lateral row;
depositing and stacking differently cut boards in each of the compartments to form a stable stack of boards within each of the compartments, the differently cut boards defining a plurality of different board lengths;
when a complete set of boards for one of the wooden structures is contained in one of the compartments, opening said compartment at its underside to remove the set of boards; and
transporting the removed set of boards away from the compartment.

10. The method according to claim 9, wherein the boards are deposited in each compartment centrally with respect to the longitudinal direction of the compartment.

11. The method of claim 9, wherein the boards are deposited in each compartment centrally with respect to the longitudinal and/or transverse direction of the boards.

12. The method according to claim 9, wherein, in each of the compartments, the set of boards is formed in a stacked form in the compartment and is removed and transported away from the compartment in the stacked form.

13. The method according to claim 12 further comprising the step of applying a mark to each of the boards to identify a position of each respective board in the wooden structure and wherein the step of depositing and stacking the differently cut boards includes stacking the boards such that the mark of each board is positioned on an upper or visible surface of the board when the set of boards is in the stacked form.

14. The method according to claim 9 wherein the step of depositing and stacking differently cut boards in each of the compartments includes gripping the boards with a feeding device and having the feeding device enter into the compartment before releasing and depositing the board within the compartment.

15. The method according to claim 9 wherein the step of depositing and stacking differently cut boards in each of the compartments includes depositing boards within the compartments with a feeding device and wherein, for at least some of the boards, the feeding device grips a first and a second one of the boards simultaneously and positions both of the first and second boards in a first one of the compartments, the feeding device then deposits the first board and removes the second board from the first one of the compartments, and then the feeding device deposits the second board in a second one of the compartments.

16. A system for buffering differently cut boards for a wooden structure, said system comprising:
several individual compartments arranged in a lateral row, each compartment configured for receiving a set of boards for said wooden structure, wherein said set of boards includes all cut boards required for said wooden structure, said set of boards defining a plurality of different board lengths;
a feeding device for filling the boards into the individual compartments and stacking them therein one above the other wherein the feeding device enters the individual compartments and deposits the boards in a stable stack within the individual compartments;
wherein each compartment is configured to be opened at its bottom for removing a respective set of boards contained therein; and
a discharge device for transporting said set of boards after removal from the respective compartment.

* * * * *